J. URBANEK.
REVERSIBLE MIRROR AND PICTURE FRAME.
APPLICATION FILED APR. 6, 1922.
1,436,615.
Patented Nov. 21, 1922.
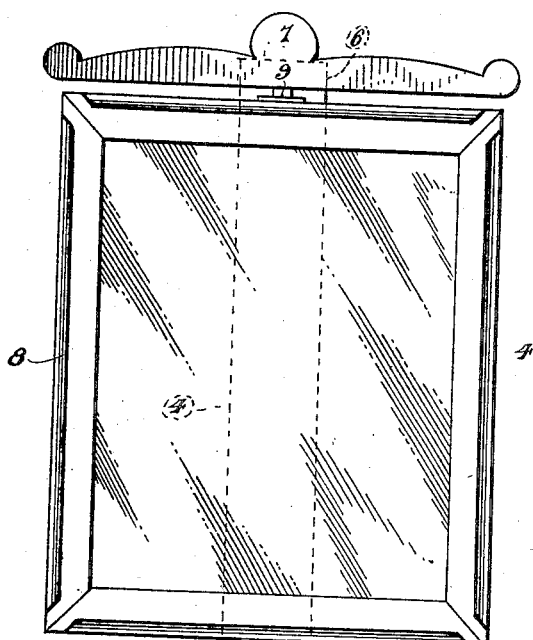
FIG. 1.
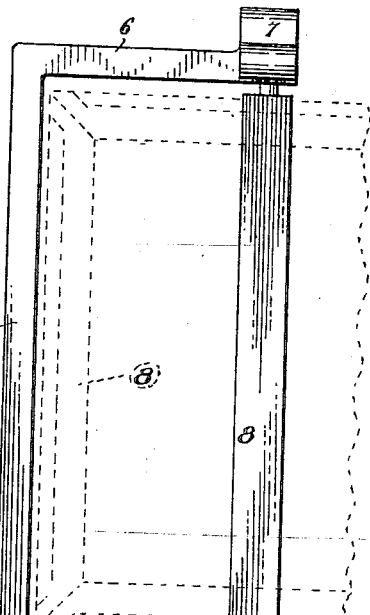
FIG. 2.
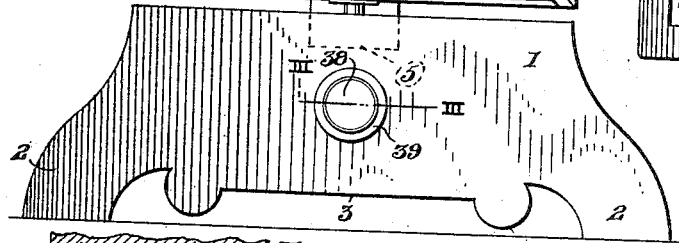
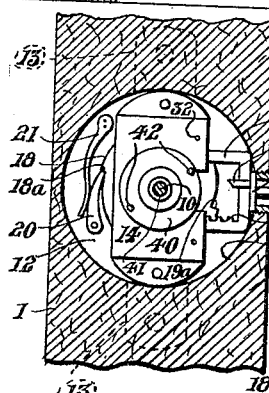
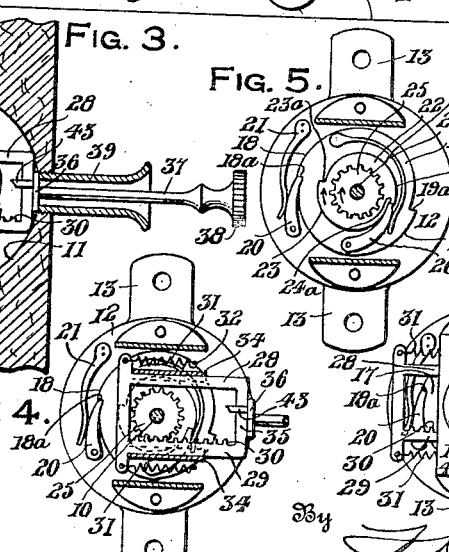
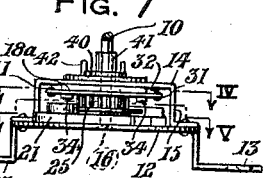
Inventor
Joseph Urbanek
By F. L. Bryant.
Attorney Patented Nov. 21, 1922.

1,436,615

UNITED STATES PATENT OFFICE.

JOSEPH URBANEK, OF CHICAGO, ILLINOIS.

REVERSIBLE MIRROR AND PICTURE FRAME.

Application filed April 6, 1922. Serial No. 550,158.

*To all whom it may concern:*

Be it known that I, JOSEPH URBANEK, a citizen of Poland, residing at Chicago, in the county of Cook and State of Illinois, have invented certain new and useful Improvements in Reversible Mirror and Picture Frames, of which the following is a specification.

This invention relates to certain new and useful improvements in reversible mirror and picture frames and has particular reference to the provision of a rotatably supported frame supporting a mirror at one side thereof, and a picture in the other side with devices for reversing the position of the frame for presenting to view, either the mirror or the picture.

The primary object of the invention resides in the provision of a manually operable mechanism for reversing the position of a frame supporting a mirror and a picture upon opposite sides with devices for limiting the rotary movement of the frame in one direction to cause the same to assume its proper position with either of the sides of the frame exposed to view.

With the above general objects in view and others that will appear as the nature of the invention is better understood, the same consists in the novel construction, combination and arrangement of parts hereinafter more fully described, illustrated in the accompanying drawings, and pointed out in the appended claims.

In the drawings forming a part of this application and in which like designating characters refer to corresponding parts through the several views:

Fig. 1 is a front elevational view of a reversible mirror and picture frame constructed in accordance with the present invention showing the mirror side of the frame exposed to view and also the pivotal mounting of the frame, Fig. 2 is a side elevational view, partly in section showing the operating mechanism for reversing the position of the frame, and also showing by dotted lines, the frame in a partially reversed position, Fig. 3 is a detail sectional view taken on line III—III of Fig. 1 showing the operating mechanism for reversing the frame housed within the base supporting block of the device, Fig. 4 is a detail sectional view taken on line IV—IV of Fig. 7 showing the manually operable rack frame and pinion for rotating one of the pivot bearings of the frame, Fig. 5 is a detail sectional view taken on line V—V of Fig. 7 showing the pinion operated cam for shifting the frame pivot post, and the cam and tensioned pawl to prevent retrograde movement of the pivot post.

Fig. 6 is a fragmentary top plan view of the operating mechanism showing the manually shifted plunger moved to its limit of operation and the devices for limiting the rotary movement of the frame supported pivot post, and Fig. 7 is a side elevational view of the frame shifting mechanism.

Referring more in detail to the accompanying drawings, and particularly to Figs. 1 to 3 there is illustrated a reversibly mounted frame for exposing to view either side of the frame that may support the mirror and a picture, the frame support including a base supporting block 1 having end feet 2 and an intermediate bottom wall 3. An angle bracket arm comprising a vertical leg 4 has at the lower end thereof, an angle end 5 preferably formed integral with the base supporting block 1 intermediate the ends thereof as shown in Figs. 1 and 2, while the upper angle end 6 of the bracket overlies the base supporting block as shown in Fig. 2 and is provided upon the free end thereof with a cross head 7. A frame 8 is rotatably supported within the angle bracket 4 and carries upon the upper end thereof a pin 9 journaled centrally of the cross head 7, while the lower end of the frame 8 carries a shaft 10 that is journaled in the base supporting block as shown in Fig. 2.

The lower supporting shaft 10 for the reversible frame 8 is associated with the manually operable mechanism for reversing the position of the frame, said mechanism being located within the socket 11 at the lower side 3 of the base supporting block as shown in Fig. 2, and including a disk plate 12 provided with angle seats 13 depending therefrom to be secured to the lower side of the bottom 3 as shown in Figs. 2 and 3. A strap 14 above the disk plate 12 is provided with angle feet 15 secured to the plate 12 while the mechanism for rotating the shaft 10 is interposed between the disk plate 12 and the strap 14 as shown in Fig. 7.

The lower end of the shaft 10 rotatably extends through the strap 14 and is swiveled at its lower end as at 16 on the disk plate 12, A disk cam 17 having diametrically opposite cam faces 18 and 19, each respectively provided with shoulders $18^a$ and $19^a$ is secured to the shaft 10 adjacent the disk plate 12 to be rotated with said shaft. To prevent retrograde movement of the cam disk 17, a pawl 20 is pivotally carried by the disk plate 12 and is engaged by a spring 21 carried by said disk forcing the pawl into engagement with the periphery of the cam disk 17 for engagement with either of the shoulders $18^a$ or $19^a$ as shown in Fig. 5. The mechanism for rotating the shaft 10 and cam disk 17 includes a smaller cam disk 22 journaled on the shaft 10 above the cam disk 17 being provided with oppositely disposed cam faces 23 and 24 having abrupt shoulders $23^a$ and $24^a$ respectively. A pinion 25 is journaled on the shaft 10 above the cam disk 22 and is fixed to said disk. As shown more clearly in Fig. 5, a pawl 26 is pivotally carried by the cam disk 17, the same being spring pressed as at 27 with the free end of the pawl 26 adapted for engagement with either of the cam holders $23^a$ or $24^a$.

A tensioned rack frame is employed for operating the pinion 25, the same being more clearly shown in Fig. 4 embodying side bars 28 and 29, the latter having rack teeth 30 upon the inner edge thereof for constant engagement with the pinion 25, the rack frame being tensioned by the springs 31 secured to pins 32 depending from the strap 14 while the other ends of the springs are connected to extensions carried by the cross bar 33 of the rack frame, the side bars 28 and 29 of the rack frame sliding in guides 34 shown more clearly in Figs. 4 and 7. The forward end of the rack frame carries a cross bar 35 provided with an upstanding lug 36 to which a plunger rod 37 having an operating head 38 is secured, the plunger rod 37 extending through a side opening in the base supporting block 1 that communicates with the sockets 11 and being enclosed by the flanged thimble 39 constituting a finger grip in the operation of the device. To limit the rotary movement of the shaft 10 upon pressing inwardly of the plunger rod 37, the disk 40 carries a collar 41 that is secured to the shaft 10 above the strap 14 as shown in Figs. 3 and 7, the disk 40 carrying diametrically opposite perpendicularly extending pins 42, adapted during rotation of the disk 40 and shaft 10 for engagement with the finger 43 by the lug 36, the pins and finger being shown in engaging position in Fig. 6.

In the operation of the device, assuming that the front side of the frame 8 is exposed to view as shown in Fig. 1, and it being desired to reverse the position of the frame 8 to expose the rear side thereof to view, the thumb is placed in engagement with the head 38 of the plunger rod 37, and the fingers engaged with the flanged end of the thimble 39, pressure upon the plunger rod 37 shifting the rack frame to cause the teeth 30 carried by the rack bar 29 to rotate the pinion 25 and cam disk 22 fixed to the pinion. During this movement, either of the cam shoulders $23^a$ or $24^a$ carried by the disk 22, engaging the pawl 26 carried by the disk 17, imparts a rotary motion to the cam disk 17, and said shaft 10 supporting the frame 8 and being fixed to the disk 17 will be rotated. Simultaneously with this movement, the disk 40 carried by the shaft 10 causes one of the pins 42 carried by said disk 40 to engage the finger 43 on the plunger rod 37, shown in Fig. 6, to arrest rotary movement of the shaft 10, and at which time the spring 21 carried by the disk plate 12 will move the pawl 20 into engagement with either of the cam shoulders $18^a$ or $19^a$ upon the cam disk 17. The springs 31 will restore the rack frame to initial position as shown in Figure 3 and prevent either of the shoulders $23^a$ or $24^a$ for engagement with the pawl 26, retrograde movement of the cam disk 17 being prevented by the spring pressed pawl 20. The cam disk 17 is rotatable only in one direction, while the cam disk 22 is rotatable in opposite directions for cooperation with the tensioned pawl 26 carried by the cam disk 17. The rotatably supported frame 8 is associated with the operating mechanism in a manner whereby a single operation of the plunger rod 37 will present for view, either face of the frame 8.

While there is herein shown and described the preferred embodiments of my inventions it is nevertheless to be understood that various forms, modifications and arrangements of the parts may be made without departing from the spirit and scope of the invention as claimed.

Having thus described the invention, what I claim as my invention is:—

1. In a reversible mirror and picture frame, a base support, a bracket carried thereby, a frame disposed between the base support and bracket, a shaft journaled in the base support constituting the lower bearing for said frame, a cam carried by the lower end of said shaft, a tensioned pawl cooperating with said cam to prevent retrograde movement thereof and means for rotating said shaft.

2. In a reversible mirror and picture frame, a base support, a bracket carried thereby, a frame disposed between the base support and bracket, a shaft journaled in the base support constituting the lower bearing for said frame, a cam carried by the lower end of said shaft, a tensioned pawl cooperating with said cam to prevent retrograde movement thereof, a tensioned pawl carried by said cam disk, and means associated with said shaft adapted to be moved into engagement with the last named pawl to rotate the cam disk.

3. In a reversible mirror and picture frame, a base support, a bracket carried thereby, a frame disposed between the base support and bracket, a shaft journaled in the base support constituting the lower bearing for said frame, a cam carried by the lower end of said shaft, a tensioned pawl cooperating with said cam to prevent retrograde movement thereof, a fixed cam disk and pinion on said shaft, a tensioned pawl carried by the first named cam disk adapted to be engaged by the last named cam disk and means for rotating said pinion to impart rotary movement to the first named cam disk.

4. In a reversible mirror and picture frame, a base support, a bracket carried thereby, a frame disposed between the base support and bracket, a shaft journaled in the base support constituting the lower bearing for said frame, a cam carried by the lower end of said shaft, a tensioned pawl cooperating with said cam to prevent retrograde movement thereof, a fixed cam disk and pinion on said shaft, a tensioned pawl carried by the first named cam disk adapted to be engaged by the last named cam disk, means for rotating said pinion to impart rotary movement to the first named cam disk, said means including a rack bar, a plunger rod fixed to said rack bar and cooperating means carried by said shaft and plunger rod for limiting rotary movement of the first named cam disk.

5. In a reversible mirror and picture frame, a base support, a bracket carried thereby, a frame disposed between the base support and bracket, a shaft journaled in the base support constituting the lower bearing for said frame, a cam carried by the lower end of said shaft, a tensioned pawl cooperating with said cam to prevent retrograde movement thereof, a fixed cam disk and pinion on said shaft, a tensioned pawl carried by the first named cam disk adapted to be engaged by the last named cam disk, means for rotating said pinion to impart rotary movement to the first named cam disk said means including a rack bar, a plunger rod fixed to said rack bar, a disk fixed to said shaft, diametrically opposite perpendicularly extending pins carried by said disk, and a finger carried by the plunger rod adapted to be engaged by either of said pins during operation to limit the rotary movement of the first named cam disk.

6. In a reversible mirror and picture frame, a base support, a perpendicular shaft journaled therein, a frame secured to the upper end of said shaft, a pair of reverse cam disks mounted on said shaft, one of which is secured thereto, a tensioned pawl carried by the fixed cam disk adapted to be engaged by the other cam disk for rotating the first named disk, a tensioned pawl cooperating with the first named disk for preventing retrograde movement thereof, and means for rotating the second named disk.

7. In a reversible mirror and picture frame, a base support, a perpendicular shaft journaled therein, a frame secured to the upper end of said shaft, a pair of reverse cam disks mounted on said shaft, one of which is secured thereto, a tensioned pawl carried by the fixed cam disk adapted to be engaged by the other cam disk for rotating the first named disk, a tensioned pawl cooperating with the first named disk for preventing retrograde movement thereof, the pinion secured to the second named cam disk being journaled on said shaft, a tensioned rack bar cooperating with said pinion for rotating the second named cam disk to impart rotary motion to the first named cam disk.

In testimony whereof I affix my signature.

JOSEPH URBANEK.